(12) United States Patent
Nakagawa

(10) Patent No.: US 6,388,905 B2
(45) Date of Patent: May 14, 2002

(54) SINGLE PHASE AC-DC CONVERTER HAVING A POWER FACTOR CONTROL FUNCTION

(75) Inventor: Shin Nakagawa, Kiyose (JP)

(73) Assignee: Fidelix, Y.K., Tokyo (JP)

( * ) Notice: Subject to any disclaimer, the term of this patent is extended or adjusted under 35 U.S.C. 154(b) by 0 days.

(21) Appl. No.: 09/898,371

(22) Filed: Jul. 3, 2001

(30) Foreign Application Priority Data

| Jul. 4, 2000 | (JP) | 2000-240433 |
| Jul. 17, 2000 | (JP) | 2000-250341 |
| Jul. 2, 2001 | (JP) | 2001-200709 |

(51) Int. Cl.[7] .................. H02M 3/355; H02M 7/00; H02M 5/42
(52) U.S. Cl. .............. 363/72; 363/97; 363/16
(58) Field of Search .............. 363/72, 71, 97, 363/131, 16

(56) References Cited

U.S. PATENT DOCUMENTS

| 4,338,658 A | * | 7/1982 | Toy | 363/72 |
| 5,351,175 A | * | 9/1994 | Blankenship | 363/16 |
| 6,201,719 B1 | * | 3/2001 | He et al. | 363/72 |
| 6,292,377 B1 | * | 9/2001 | Sasaki | 363/71 |

OTHER PUBLICATIONS

Patent Abstracts of Japan, Publication No. 08–103080, published Apr. 16, 1996.

* cited by examiner

*Primary Examiner*—Bao Q. Vu
(74) *Attorney, Agent, or Firm*—Norris, McLaughlin & Marcus P.A.

(57) ABSTRACT

The single-phase AC-DC converter includes a PFC power supply section, where a rectified current obtained by rectifying an electric current from an AC supply is switched; a DC-DC power supply section, where a direct current obtained by rectifying and smoothing an electric current from an AC supply is switched; a first switching element for conducting a switching operation in the PFC power supply section; a second switching element for conducting a switching operation in the DC-DC power supply section; a drive pulse generating circuit for generating first drive pulses for driving said first switching element and second drive pulses for driving said second switching element; and a servo loop for controlling the drive pulse generating circuit. The servo loop is constituted of only one serve loop; and the duty ratio of the drive pulses for driving the first switching element is different from the duty ratio of the drive pulses for driving the second switching element from each other in a linked manner.

12 Claims, 7 Drawing Sheets

SINGLE PHASE AC-DC CONVERTER HAVING A POWER FACTOR CONTROL FUNCTION

BACKGROUND OF THE INVENTION

1) Field of the Invention

The present invention relates to a single phase AC-DC converter, and particularly, relates to a single phase AC-DC converter having a construction that a PFC (Power Factor Control) power supply section, where a rectified current obtained by rectifying an electric current from an AC supply is switched, and a DC-DC power supply section, where a direct current obtained by rectifying and smoothing an electric current from an AC supply is switched, are combined together; the switching elements for switching both the sections are driven and controlled with only one servo loop.

2) Related Art

The present inventor discloses a single phase AC-DC converter where a PFC power supply section and a DC-DC power supply section are combined together in Japanese Patent Preliminarily Publication No. 11-356046. In the power supply apparatus, a PFC switching power supply section (rectified current side) having a smaller current smoothing function and a DC-DC switching power supply section (direct current side) having a greater current smoothing function are combined in a parallel manner; the rectified outputs of these sections are added together; thereby a harmonics current can be restricted, the size of the converter becomes compact, and a high efficiency can be obtained. In this apparatus, the rectified current side contributes to restrict a harmonics current, while the direct current side keeps a holding time sufficiently and reduces a ripple voltage. By making a balance of power between the rectified current side section and the direct current side section, a switching power supply apparatus is realized, which is small in size and has a high efficiency while satisfying the Class A standard for harmonics by the IEC (International Electrotechnical Commission).

In addition, so-called two-stage type AC-DC converters are also developed, which also have a PFC power supply section and a DC-DC power supply section being connected together in a cascade manner in order to restrict a harmonics current.

However, according to the AC-DC converter mentioned in Japanese Preliminarily Patent Publication 11-356046, in order to set the electric current ratio between the rectified current side section and the direct current side section so as to satisfy said standard for harmonics by IEC, it is necessary to keep the inductance at the rectified current side section considerably low. Therefore, the current waveform at the primary side of the rectified current side section becomes a narrow triangle and thus the route-mean-square current increases there. As a result, the efficiency cannot be improved as expected.

The current International Standard for harmonics current is IEC61000-3-2. According to the AC-DC converter mentioned in Japanese Preliminarily Patent Publication 11-356046, in the case that the converter is designed for accepting an input voltage in a range of 100V to 240V, the current waveform belongs to the Class A of the IEC62000-3-2, so that the converter satisfies the harmonics spectrum standard defined by the Class A without problem.

However, it is planned to change the International Standard of the EEC in future, and a provisional standard has been defined at the end of 2000. According to the provisional standard, it is required for certain appliances, i.e. personal computers, televisions, or monitors, to meet the Class D, which is stricter than the Class A. The converter according to the Japanese Preliminarily Patent Publication 11-356046 satisfies the harmonics standard in Class D if the converter is so designed as to accept an input voltage of 100~120V or an input voltage of 200~240V. However, if the converter is designed to accept an input voltage in a wider range, i.e. 100~240V, it is difficult to satisfy the harmonics standard in Class D.

On the other hand, according to the conventional two-stage type AC-DC converter, where the rectified-line side section and the direct current side section are combined together in a cascade manner, satisfies the harmonics current standard in Class D by the IEC, the efficiency, however, is poor and it is difficult to make the size of the converter compact. Further, power consumption during standby time cannot be reduced in a sufficient manner and the cost for manufacturing the converter is still high.

SUMMARY OF THE INVENTION

In order to solve the above-mentioned problems, an AC-DC converter according to the present invention comprises a PFC power supply section where a rectified current obtained by rectifying an electric current from an AC supply is switched, a DC-DC power supply section where a direct current obtained by rectifying and smoothing an electric current from an AC supply is switched, a first switching means for conducting a switching operation in said PFC power supply section, a second switching means for conducting a switching operation in said DC-DC power supply section, a drive pulse generating circuit for generating first drive pulses for driving said first switching means and second drive pulses for driving said second switching means, and a servo loop for controlling said drive pulse generating circuit; wherein said servo loop is constituted of only one serve loop; and wherein said converter comprises a duty ratio controlling means for making a duty ratio (ON time) of said drive pulses for driving said first switching means and a duty ratio (ON time) of said drive pulses for driving said second switching means different from each other in a linked manner.

In this manner, according to the AC-DC converter of the present invention, a duty ratio controlling means is provided, by which the duty ratio (ON time) of the drive pulses for driving the first switching means and the duty ratio (ON time) of the drive pulses for driving the second switching means become different from each other in a linked manner, so that efficiency is improved and the size of the converter can be made compact.

Further, the AC-DC converter according to the present invention has a characteristic in that said PFC power supply section comprises an input for connection to a source of a single phase AC supply, a first rectifying circuit for rectifying an electric current supplied from said inputs, a first transformer where one end of the primary coil thereof is connected to an output of said rectifying circuit and the other end of said primary coil is connected to said first switching means, and a first secondary side rectifying circuit for rectifying an output of the secondary side of said first transformer; said DC-DC power supply section comprises an input for connection to a source of a single phase AC supply, a second rectifying circuit for rectifying an electric current supplied from said inputs, a smoothing circuit for smoothing an output of said second rectifying circuit, a second transformer where one end of the primary coil thereof is connected to an output of said smoothing circuit and other end of said primary coil is connected to said second switching means, and a second secondary side rectifying circuit for rectifying an output of the secondary side of said second transformer; and said converter comprises an adding and smoothing circuit for adding an output of said PFC power supply section and an output of said DC-DC power supply section together and smoothing the added outputs.

According to the construction in that the PFC power supply section and the DC-DC power supply section are operated with different duty ratios and that the PFC power supply section and the DC-DC power supply section are combined in a parallel manner and the outputs of both power supply sections are added together and smoothed, the efficiency of the converter can be more improved.

Further, the AC-DC converter according to the present invention has a characteristic in that said PFC power supply section comprises an input for connection to a source of a single phase AC supply, a first rectifying circuit for rectifying an electric current supplied from said inputs, a first transformer where one end of the primary coil thereof is connected to an output of said rectifying circuit and other end of said primary coil is connected to said first switching means, and a first secondary side rectifying circuit for rectifying an output of the secondary side of said first transformer; said DC-DC power supply section comprises an input for connection to a source of a single phase AC supply, a smoothing circuit for smoothing an electric current supplied from said inputs, a second transformer where one end of the primary coil thereof is connected to an output of said smoothing circuit and other end of said primary coil is connected to said second switching means, and a second secondary side rectifying circuit for rectifying an output of the secondary side of said second transformer; and said converter comprises an output adding and smoothing circuit for adding an output of said PFC power supply section and an output of said DC-DC power supply section together and smoothing the added outputs; and wherein an inductor and a diode are inserted between said second switching means and an output of said first rectifying circuit or between said second switching means and said AC inputs.

Furthermore, the AC-DC converter according to the present invention has a characteristic in that said PFC power supply section comprises an input for connection to a source of a single phase AC supply, a first rectifying circuit for rectifying an electric current supplied from said inputs, a first transformer where one end of the primary coil thereof is connected to an output of said rectifying circuit and other end of said primary coil is connected to said first switching means, and a first secondary side rectifying circuit for rectifying an output of the secondary side of said first transformer; said DC-DC power supply section comprises an input for connection to a source of single phase AC supply, a smoothing circuit for smoothing an electric current supplied from said inputs, a second transformer where one end of the primary coil thereof is connected to an output of said smoothing circuit and the other end of said primary coil is connected to said second switching means, and a second secondary side rectifying circuit for rectifying an output of the secondary side of said second transformer; and said converter comprises an output adding and smoothing circuit for adding an output of said PFC power supply section and an output of said DC-DC power supply section together and smoothing the added outputs; wherein either said first transformer or said second transformer comprises a tertiary coil, and one end of the tertiary coil is connected to an output of said smoothing circuit and the other end thereof is connected to an output of said first rectifying circuit via a diode or to said AC inputs via a diode.

According to the construction above, harmonics which are generated in the DC-DC power supply section can be reduced, so that an AC-DC converter satisfying the strict standard in Class D by the EEC can be realized.

Moreover, the AC-DC converter according to the present invention has a characteristic in that the PFC power supply section comprises an input for connection to a source of single phase AC supply, a first rectifying circuit for rectifying an electric current supplied from said inputs, a choke coil where one end of the coil thereof is connected to an output of said rectifying circuit and the other end of the coil is connected to said first switching means; said DC-DC power supply comprises a second rectifying circuit for rectifying an output of said choke coil, a first smoothing circuit for smoothing an output of said second rectifying circuit, a transformer where one end of the primary coil thereof is connected to an output of said smoothing circuit and the other end of the primary coil is connected to said second switching means, a secondary side rectifying circuit for rectifying an output at the secondary side of said transformer, and a second smoothing circuit for smoothing an output of said secondary side rectifying circuit.

Moreover, the AC-DC converter according to the present invention has a characteristic in that the PFC power supply section comprises an input for connection to a source of a single phase AC supply, a first rectifying circuit for rectifying an electric current supplied from said inputs, a first transformer where one end of the primary coil thereof is connected to an output of said rectifying circuit and other end of the primary coil is connected to said first switching means, and a first secondary side rectifying circuit for rectifying an output at the secondary side of said first transformer; said DC-DC power supply comprises a second rectifying circuit for rectifying an output at the primary side of said first transformer, a first smoothing circuit for smoothing an output of said second rectifying circuit, a second transformer where one end of the primary coil thereof is connected to an output of said first smoothing circuit and other end of the primary coil is connected to said second switching means, a second secondary side rectifying circuit for rectifying an output at the secondary side of said second transformer, a second smoothing circuit for smoothing an output of said second secondary side rectifying circuit, and an adding and smoothing means for adding an output of said PFC power supply section and an output of said DC-DC power supply section together and smoothing the added output.

In this manner, the PFC power supply section and the DC-DC power supply section may be connected together in a cascade manner. According to the construction, a two-stage type AC-DC converter can be realized where the size is small and power consumption during standby time can be made sufficiently low.

In the AC-DC converter according to the present invention it is preferred that the drive pulses for driving the first switching means and the drive pulses for driving the second switching means turn ON at a different timing from each other but turn off at the same timing.

It is further preferred that the ON time of the drive pulses for driving the first switching means and the ON time of the drive pulses for driving the second switching means are different from each other keeping a given relation, whereby the ratio between the duty ratio of the first switching means and the duty ratio of the second switching means becomes constant.

By keeping the ratio between the duty ratio of the first switching means and the duty ratio of the second switching means constant, the AC-DC converter operates in a suitable manner without regarding the input voltage condition or the load current condition.

Furthermore, the AC-DC converter according to the present invention has a characteristic in that said drive pulse generating means comprises a drive pulse intermittently oscillation control means by which the drive pulse generating means generates the drive pulses intermittently.

By providing the drive pulses intermittently oscillation control means, the power consumption during standby time can be more reduced.

It is preferred that the drive pulses intermittently oscillation control means comprises a comparator having a hysteresis characteristic and/or a time constant so that the drive pulse output of the drive pulse generating means is controlled in accordance with the output of said comparator.

Furthermore, the AC-DC converter according to the present invention comprises a starting-up circuit for starting the drive pulse generating means up; said starting-up circuit comprises an input for connection to a source of single phase AC supply, a rectifying circuit for rectifying an electric current supplied from said inputs, a smoothing circuit for smoothing an output of said rectifying circuit, and starting-up capacitors being provided between said AC inputs and said rectifying circuits. According to the construction, an reactive current can be used to start up the drive pulse generating means and thus no starting-up resistor is required. Therefore, the power consumption there can be reduced more.

Moreover, it is preferred that the rectifying circuit is constituted of a bridge rectifying circuit, and the starting-up circuit has a voltage detecting circuit after said rectifying circuit, and a switch element, which is driven by the output of the voltage detecting circuit, being provided at an output side of either one of the starting-up capacitors.

According to the construction, when the input voltage is low, the rectifying circuit operates as a full-wave rectifying circuit, while when the input voltage is high it works as a half-wave rectifying circuit. Therefore, even if the converter is operated with a high input voltage, no current is wasted in the starting-up circuit, so that power consumption can be more reduced.

By the way, it should be noted that in this specification the DC-DC power supply section includes the rectifying circuit and the smoothing circuit at the primary side.

DETAILED EXPLANATION OF THE PREFERRED EMBODIMENTS

Figure 1:
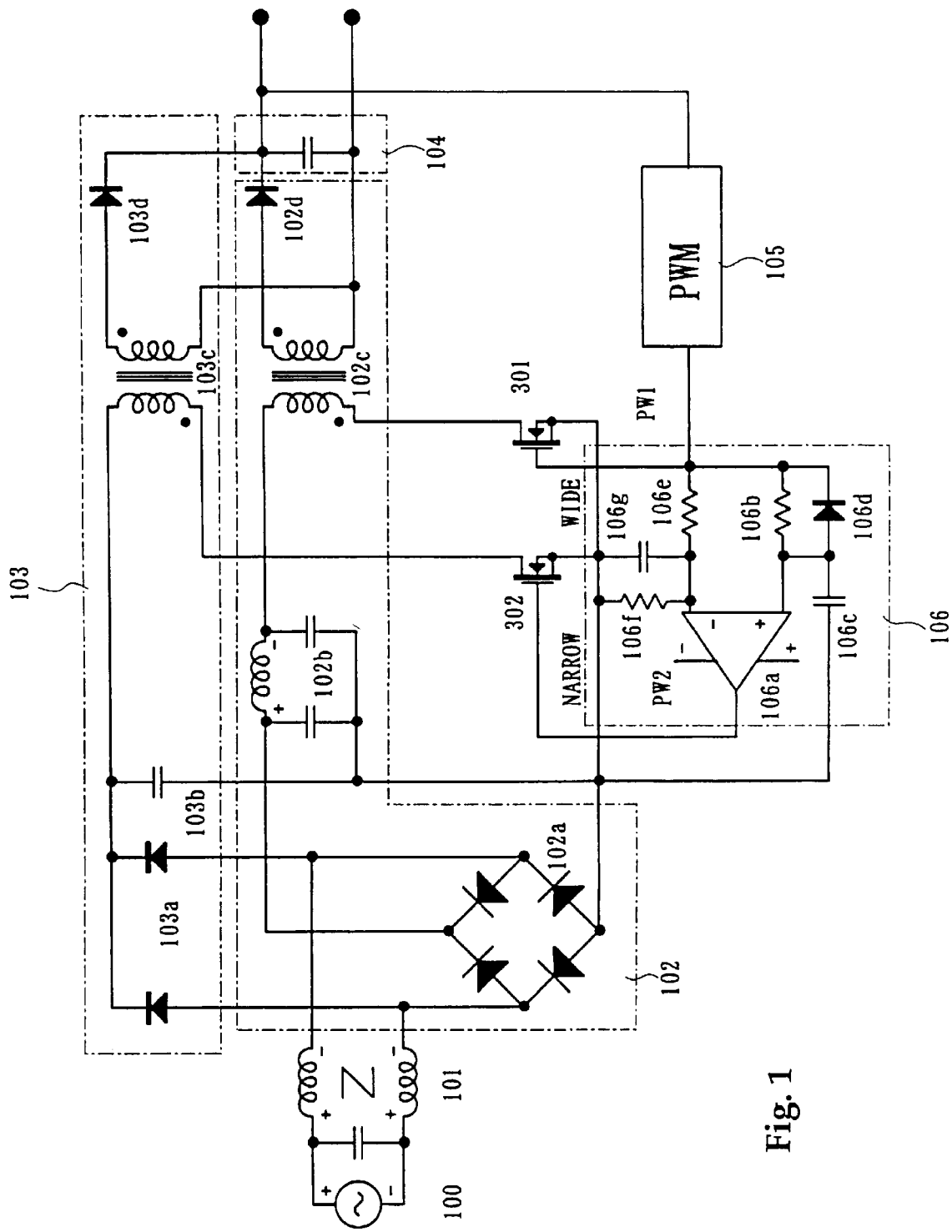
FIG. 1 is a circuit diagram showing a construction of the first embodiment according to the present invention.

FIG. 1 is a circuit diagram showing a construction of the first embodiment of the AC-DC converter according to the present invention. In the AC-DC converter of the first embodiment, the PFC power supply section and the DC-DC power supply section are connected in a parallel manner and the outputs of both the sections are added together and smoothed to be outputted.

The AC-DC converter of the first embodiment has an AC power supply 100, an LC noise filter 101, a PFC power supply section 102, a DC-DC power supply section 103, an output adding and smoothing section 104 for adding outputs of the PFC power supply section and the DC-DC power supply section, a PWM control circuit 105, an ON time delay circuit 106, a first switching element 301 for switching the PFC power supply section and a second switching element 302 for switching the DC-DC power supply section.

The PFC power supply section 102 comprises a bridge diode 102a, a π shaped noise filter 102b, a first transformer 102c, a rectifying diode 102d for rectifying the secondary output of the first transformer 102c. One end of the primary coil of the first transformer 102c is connected to the bridge diode 102a via the π shaped filter 102b and the other end of the primary coil is connected to the first switching element 301.

While, the DC-DC power supply section 103 has a rectifying diodes 103a, a smoothing capacitor 103b, a second transformer 103c and a secondary rectifying diode 103d for rectifying the secondary output of the transformer 103c. One end of the primary coil of the second transformer 103c is connected to the smoothing capacitor 103b and the other end thereof is connected to the second switching element 302.

The output of the PFC power supply section 102 and the output of the DC-DC power supply section 103 are added together and smoothed in the adding and smoothing section 104, then outputted to a load.

In the converter, the output of the adding and smoothing section 104 is taken out and inputted to the PWM control circuit 105 in order to conduct a servo control for operating the switching elements 301 and 302. It should be noted that only one servo control loop is provided for both the switching elements 301 and 302.

The operation of the switching elements 301 and 302 is controlled by drive pulses PW1 and PW2 generated in the PWM control circuit 105. In the first embodiment, turn-on timing delaying circuit 106 is provided between the PWM control circuit 105 and the second switching element 302, so that the turn-on timing of the drive pulse PW2, which is for the second switching element, is delayed from the turn-on timing of the drive pulse PW1 for the first switching element with a given ratio. That is to say, the delay of PW2 from PW1 varies being linked with the ON time of the drive pulse PW1.

More concretely, the output PW1 from the PWM control circuit 105 is supplied to the first switching element 301, while to the second switching element it is supplied via the turn on timing delaying circuit 106. The turn-on timing delaying circuit 106 has a comparing circuit constituted of a comparator 106a; a triangular wave generating circuit, which is provided on the plus side of the comparator 106a, being constituted of a resistor 106b, a capacitor 106c, and a diode 106d; and a averaging circuit, which is provided on the minus input side of the comparator 106a, constituted of resistors 106e and 106f, and a capacitor 106g. The time constant of the averaging circuit is set at a value which does not respond to the switching frequency of the second switching element 302 but responds to the commercial frequency. Therefore, the pulse width of the output PW2 of the turn-on timing delaying circuit 106 becomes smaller than that of the output PW1 of the PWM control circuit 105 with a given ratio (the duty ratio of PW2/the duty ratio of PW1).

In this manner, the first switching element 301 is driven by the output PW1 of the PWM control circuit 105 and the second switching element 302 is driven by the output PW2 of the turn-on timing delaying circuit 106, by which the turn-on timing of the PW1 is delayed from that of the PW1 with a given ratio (the duty ratio of PW2/the duty ratio of PW1); therefore, the duty ratio of the first switching element 301 becomes greater than that of the second switching element 302. As a result, the difference between the inductance of the first transformer 102c and the inductance of the second transformer 103c becomes shorter, compared to the case that both the transformers are switched by the switching signals driven by the signals having the same pulse width, so that the efficiency can be more improved and the size of the converter becomes more compact.

The minus terminal of the comparator 106a may be connected to a fixed voltage. In this case, the pulse width of the output PW2 of the turn-on timing delaying circuit 106 becomes different from that of the output PW1 of the PWM control circuit 105 with a fixed difference.

Figure 2:
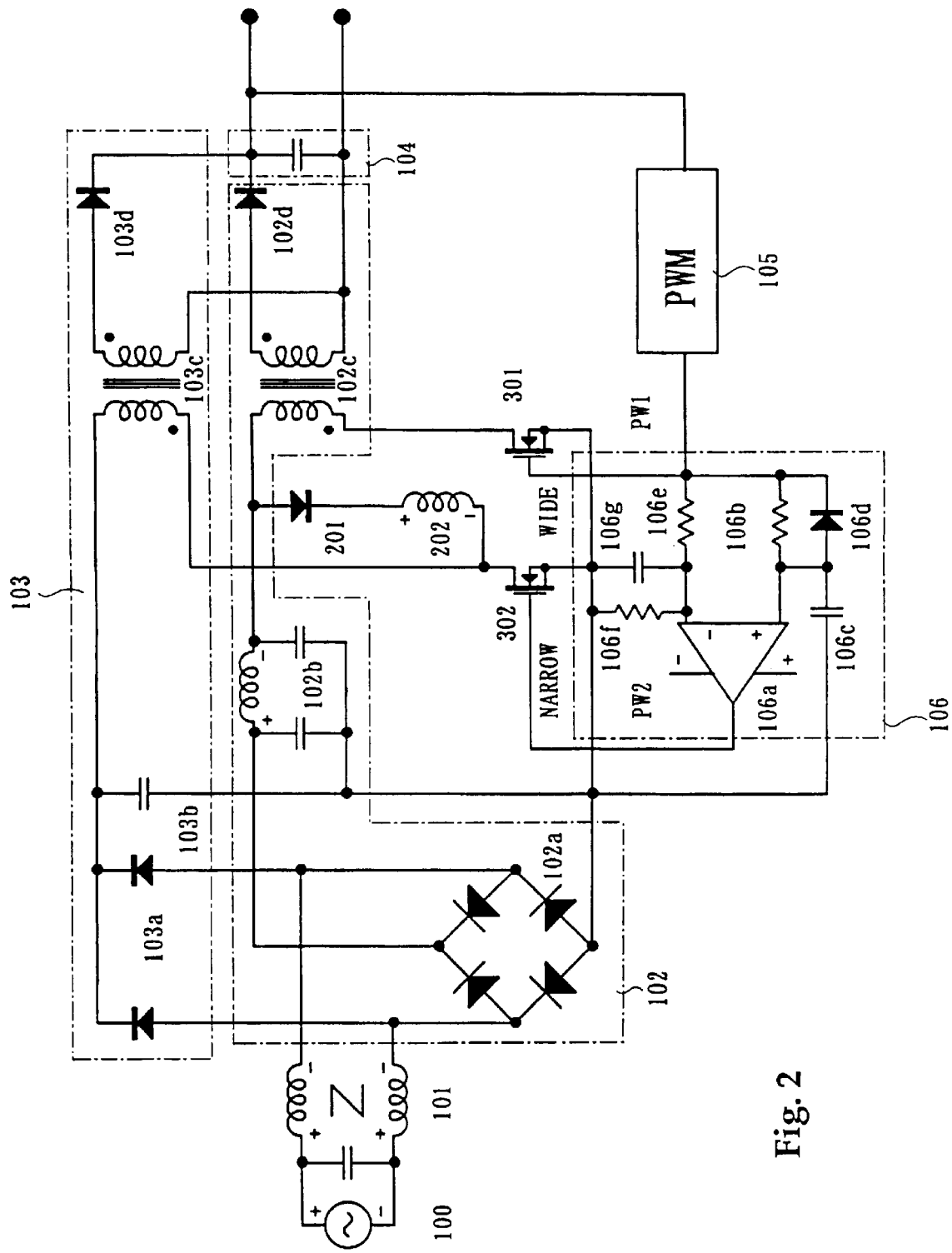
FIG. 2 is a circuit diagram depicting a construction of the second embodiment according to the present invention.

FIG. 2 is a circuit diagram showing a construction of the second embodiment of the AC-DC converter according to the present invention. It should be noted that in the embodiments explained below the same numerical references are used for the same elements as those in the first embodiment, and the explanation for the elements is omitted here.

In the second embodiment, a diode 201 and an inductor 202 are inserted between the bridge diode 102a and the second switching means 302 in a series manner; the other construction maintains the same condition as that of the first embodiment. According to the construction, whenever the second switching element 302 becomes ON, the inductor 202 is excited, and then, when the second switching element 302 is OFF, the excited current generated in the inductor 202 is supplied to the smoothing capacitor 103b through the primary coil of the second transformer 103c, so that the capacitor 103b is charged. Therefore, the electric current coming from the rectifying circuit 103a to the smoothing capacitor 103b is reduced in the DC-DC power supply section 103, so that the generation of harmonics in the rectifying circuit 103a can be reduced.

Figure 3:
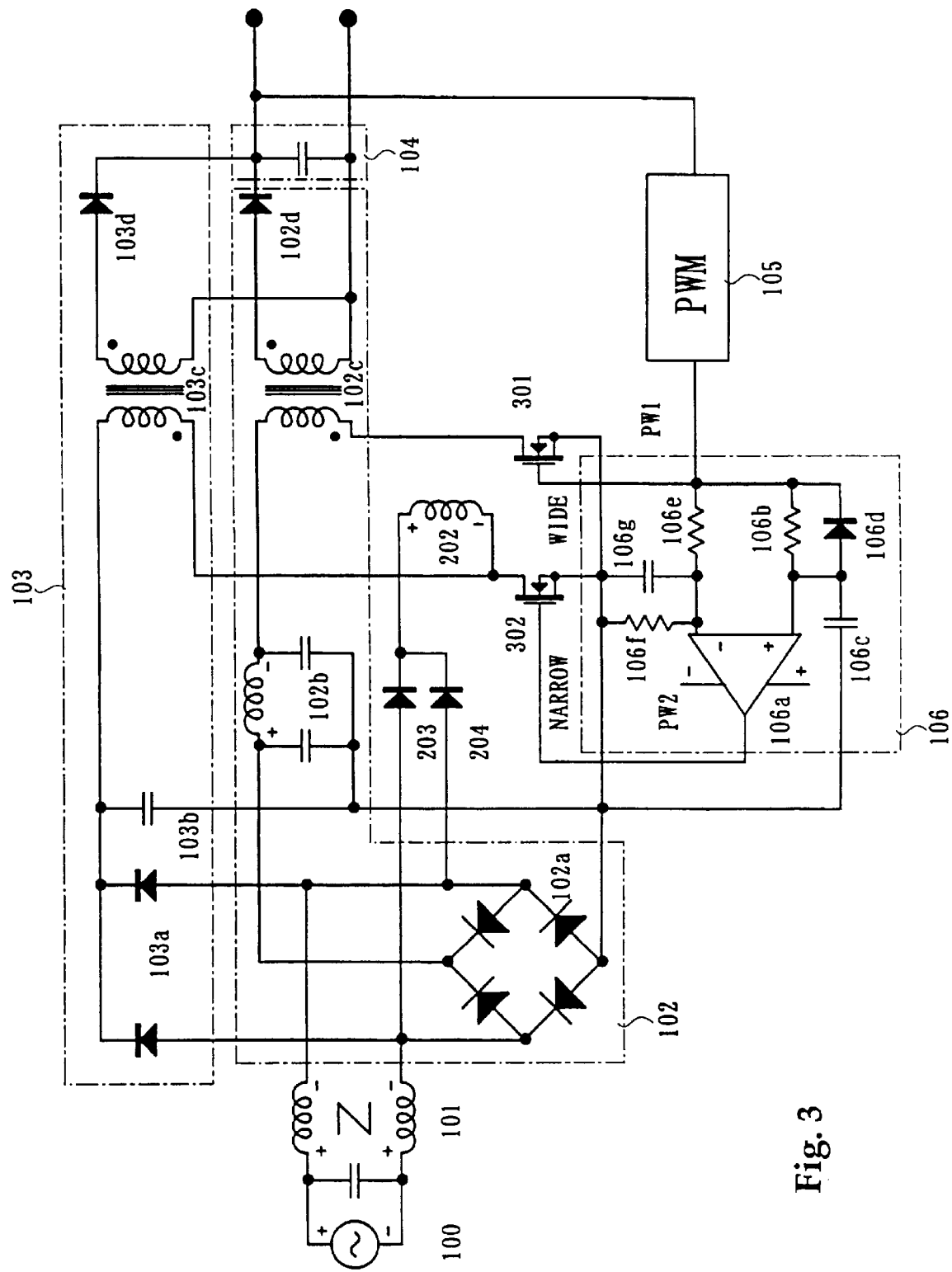
FIG. 3 is a circuit diagram representing a construction of a modification for the second embodiment depicted in FIG. 2.

FIG. 3 is a circuit diagram showing a modification of the AC-DC converter mentioned in the second embodiment. In this modification, diodes 203 and 204 and an inductor 202 are inserted between the AC inputs and the second switching element 302 in a series manner. According to the construction, when a high input voltage of 200V or more, for instance, is applied, harmonics can be reduced more effectively. It should be noted that both in the converters shown in FIGS. 2 and 3, if a necessary amount of electric current is supplied from the inductor 202 to the smoothing capacitor 103b, the rectifying circuit 103a of the DC-DC power supply section may be omitted.

Figure 4:
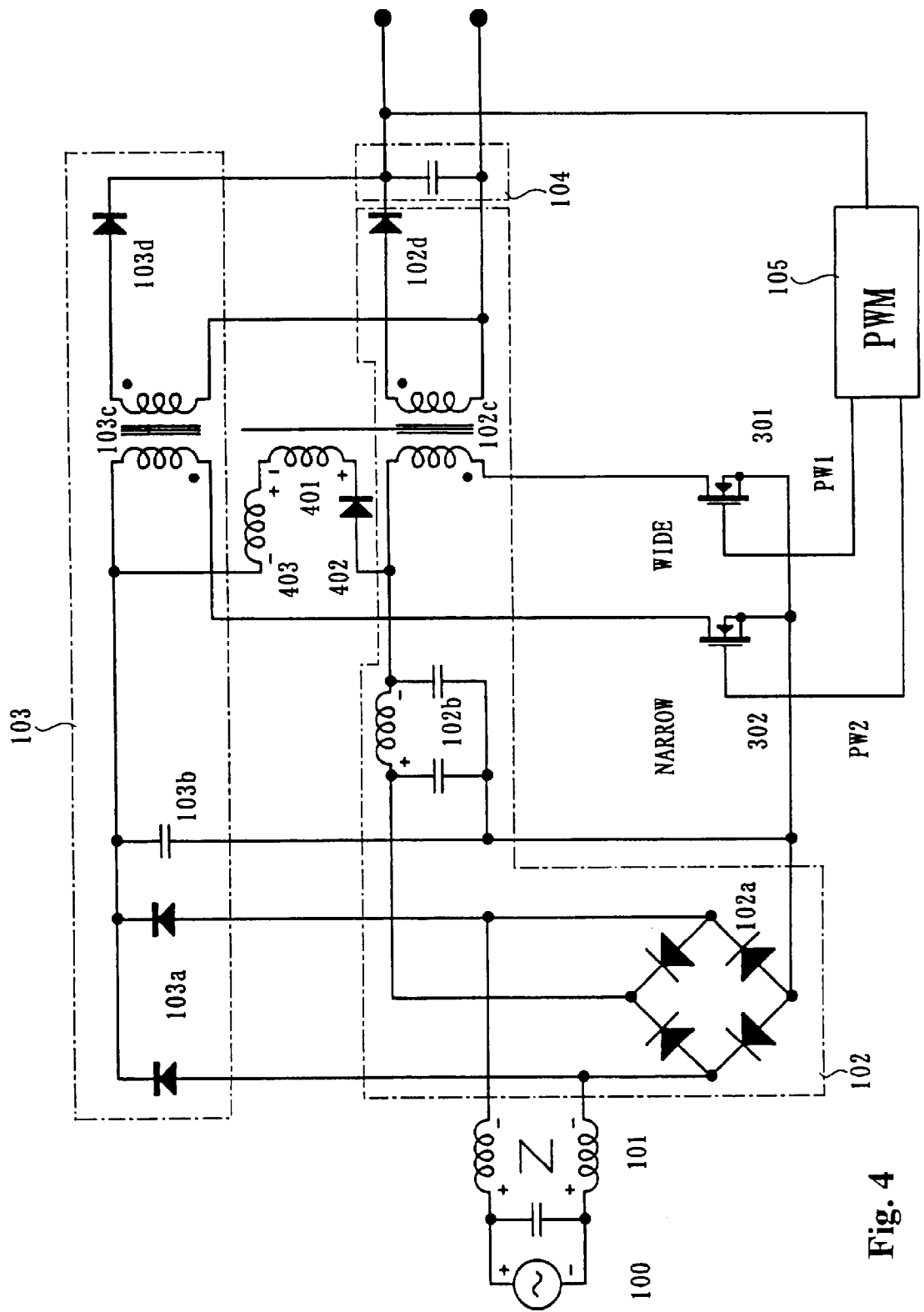
FIG. 4 is a circuit diagram illustrating a construction of the third embodiment according to the present invention.

FIG. 4 is a circuit diagram showing a construction of the AC-DC converter according to the third embodiment of the present invention. In the third embodiment, a tertiary coil 401 is provided in the first transformer 102c (or the second transformer 103c) in addition to the basic construction mentioned in FIG. 1; one of the ends of the tertiary coil 401 is connected to the smoothing circuit 103b of the DC-DC power supply section 103 and the other end thereof is connected to the noise filter 102b of the PFC power supply via a diode 402. According to the construction, the high frequency voltage generated in the switching element provided on the section where the tertiary coil 401 is provided is added to the rectified voltage so that a continuity angle of the diode 402 can be made widened. In FIG. 4, the tertiary coil 401 is provided in the first transformer 102c of the PFC power supply section 102, however, it may be possible to provide a tertiary coil 401 in the second transformer 103c of the DC-DC power supply section 103. Further, the tertiary coil 401 is connected in a forward mode here, however it may be connected in a flyback mode.

Furthermore, the other end of the tertiary coil 401 may be connected to the AC inputs. In this case, diodes should be inserted into both lines, respectively.

In the third embodiment shown in FIG. 4, an inductor 403 is inserted between the tertiary coil 401 and the smoothing capacitor 103b of the DC-DC power supply section 103. However, an external inductor can be also used, a leakage inductor from the tertiary coil 401 can also be used therefor.

In the third embodiment, if a necessary current is supplied to the smoothing capacitor 103b of the DC-DC power supply section 103 from the tertiary coil 401 and/or the inductor 403, the rectifying diodes 103a of the DC-DC power supply section 103 can be omitted.

Furthermore, the diode 201 and the inductor 202 shown in FIG. 2 and/or the diodes 203, 204 and the inductor 202 shown in FIG. 3 may be added to the third embodiment. In this case, the diode 201 and the diode 403 can be used commonly. In addition, the inductor 202 can be omitted so that only the diode is connected there.

It should be noted that in the AC-DC converters according to the second and third embodiments, even if the pulse widths of the drive pulses PW1, PW2 for driving the first and second switching elements 301 and 302 are the same, it is possible to restrict the harmonics by the circuit constructions mentioned above. However, if the turn-on timing delaying circuit 106 such as that shown in FIG. 1 is provided between the PWM control circuit 105 and the second switching element 302, efficiency can be more improved.

Figure 5:
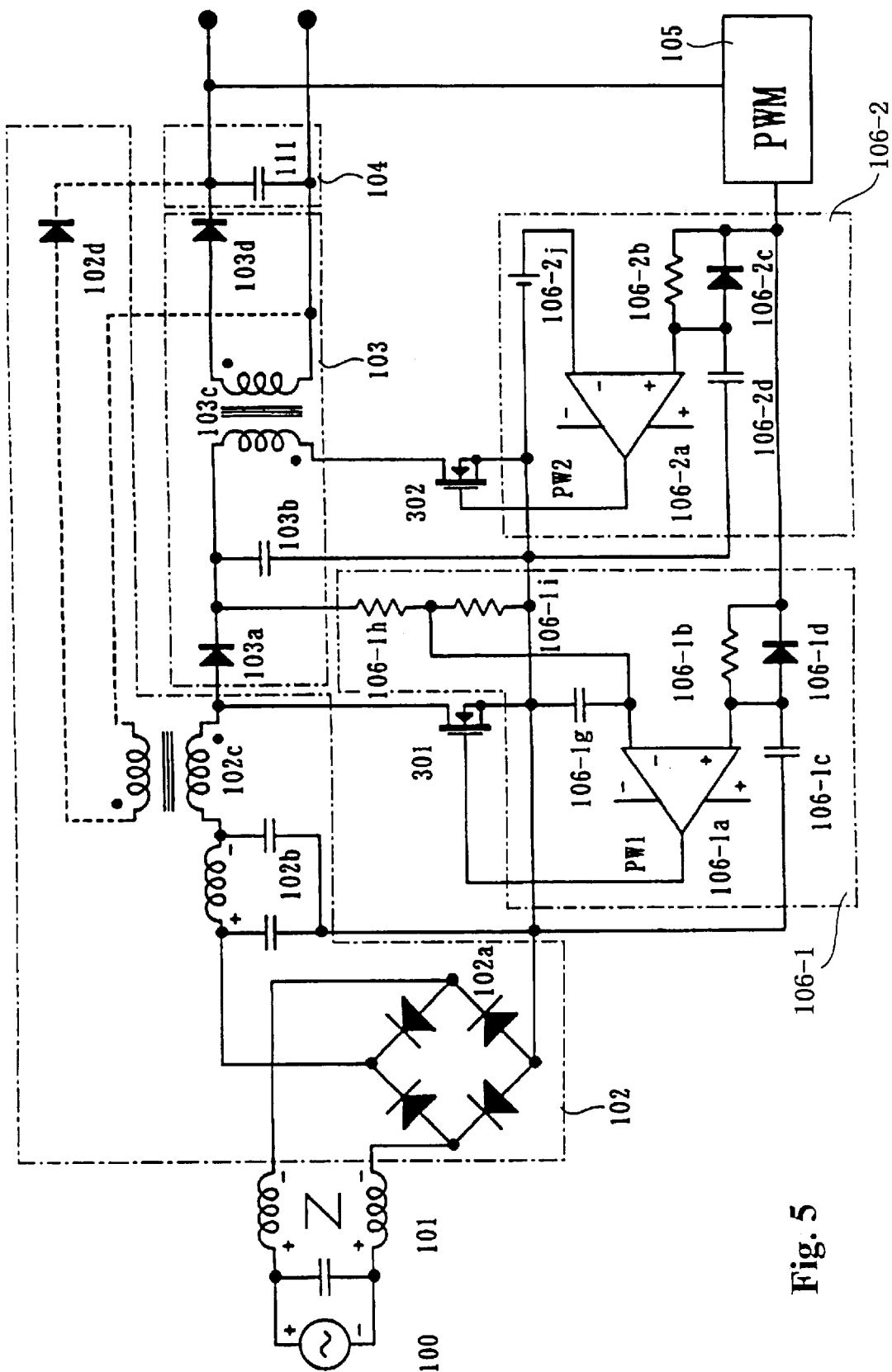
FIG. 5 is a circuit diagram showing a construction of the fourth embodiment according to the present invention.

FIG. 5 is a circuit diagram illustrated the construction of the fourth embodiment according to the invention. In the fourth embodiment, a two-stage type AC-DC converter is shown, where the PFC power supply section 102 and the DC-DC power supply section 103 are connected together in a cascade manner.

According to the fourth embodiment, the PFC power supply section has a rectifying diode 102a, a π shaped filter 102b, and a choke coil 102c; to an output of the choke coil 102c, is connected the DC-DC power supply section 103 in a cascade manner, which includes a rectifying diode 103a, a smoothing capacitor 103b, a second transformer 103c, and a secondary rectifying circuit 103d. The output of the chock coil 102c is connected to the first switching element 301; during when the first switching element 301 is made ON, the choke coil 102c is excited; then the excited current in the choke coil 102c is stored in the smoothing capacitor 103b via the diode 103a while the first switching element 301 is OFF; then the voltage at the capacitor 103b is switched by the second switching element 302 through the primary coil of the second transformer 103c.

In the fourth embodiment, a first turn-on timing delaying circuit 106-1 and a second turn-on timing delaying circuit 106-2, which operate in a linked manner, are provided between the PWM control circuit 105 and the switching elements 301 and 302, respectively.

The first turn-on timing delaying circuit 106-1, which supplies drive pulses to the first switching element 301, has a comparing circuit constituted of a comparator 106-1a, a triangular wave generating circuit, which is provided at the plus input side of the comparator 106-1a, constituted of a resistor 106-1b, a capacitor 106-1c and a diode 106-1d, and an averaging circuit, which is provided at the minus input side of the comparator 106-1a, constituted of resistors 106-1h, 106-1i and a capacitor 106-1g.

The second turn-on timing delaying circuit 106-2, which supplies drive pulses to the second switching element 302, has a comparing circuit constituted of a comparator 106-2a, and a triangular wave generating circuit, which is provided at the plus input side of the comparator 106-2a, constituted of a resistor 106-2b, a capacitor 106-2c and a diode 106-2d; the minus input side of the comparator 106-2a is connected to a fixed voltage 106-2j.

It should be noted that to the minus input side of the comparator 106-1a of the first turn-on timing delaying circuit 106-1, a voltage at smoothing capacitor 103b of the DC-DC power supply section 103 is supplied, being divided by the resistors 106-1h and 106-1i.

According to the construction, when the input voltage is low (100V, for instance), the ON time of the first switching element 301 becomes wider than that of the second switching element 302; while, when the input voltage is high (240V, for instance), the ON time of the second switching element 302 becomes wider than that of the first switching element 301. Therefore, by selecting a suitable circuit constant, the voltage at the smoothing capacitor 103b can be set at a voltage at which the best efficiency can be obtained. The best efficiency can be obtained, for example, at DC 260V at the smoothing capacitor 103b when the input voltage is low (100V, for instance), and at DC370V at the smoothing capacitor 103b when the input voltage is high (240V).

In the AC-DC converter shown in FIG. 5, the first switching element 301 is connected to the output of the choke coil 102c. However, it may be arranged such that the switching element 301 is connected to a tap provided in the choke coil 102c. Further, it is also possible to arrange such that a tertiary coil is added to the choke coil 102c and an output of the tertiary coil is rectified by the diode 103a. In case that the tertiary coil is added, the other end of the tertiary coil may be connected either to the plus side or the minus side of the noise filter 102b.

It should be noted that the choke coil 102c of the PFC power supply section 102 may be substituted by a first transformer as shown by a broken line in FIG. 5. By adding a diode 102d to the first transformer, a bypass route of electric power is made there, so that efficiency can be improved.

According to the construction of the fourth embodiment, the manufacturing cost for the converter can be reduced because an IC for conducting a power factor correction, or a multiplier, which are required in normal two-stage type converters, are not necessary. In addition, another advantage can be expected that the switching noise becomes low because the switching frequency at the PFC power supply section and that at the DC-DC power supply section are the same. Furthermore, according to the invention, only one servo circuit is required for operating the switching elements 301 and 302; therefore, the loss can be reduced and the power consumption during standby time can be reduced.

Figure 6:
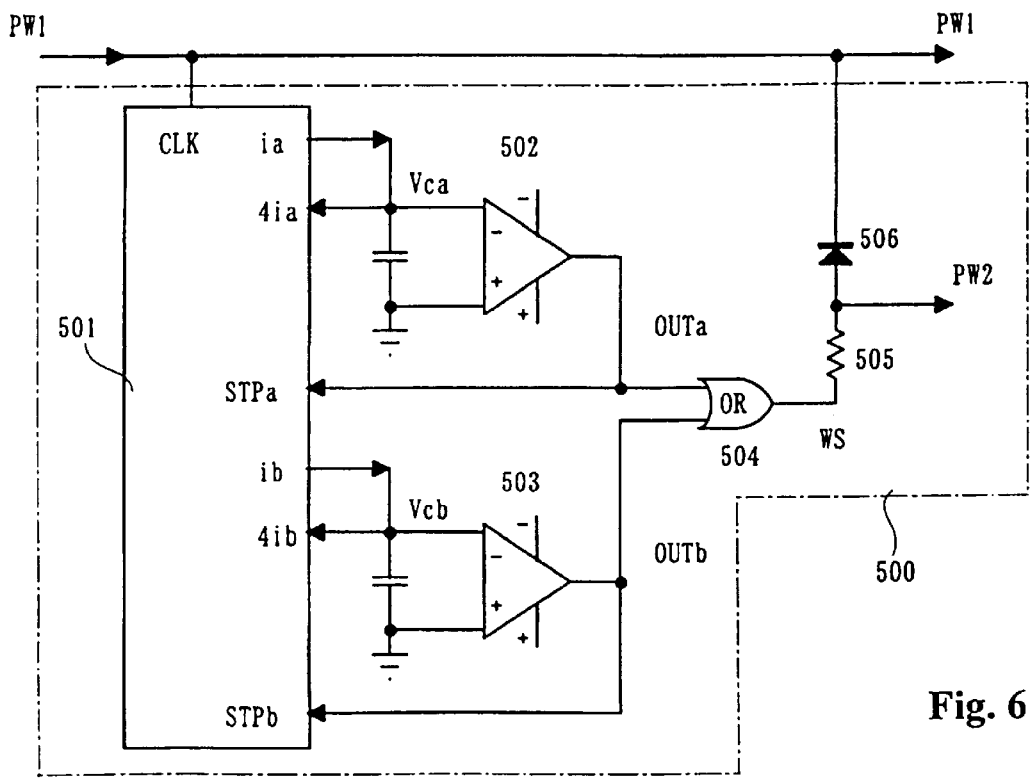
FIG. 6 is a circuit diagram depicting another example of the turn-on timing delaying circuit provided in the converter shown in FIG. 1.

FIG. 6 shows a modification of the pulse width control circuit (turn-on timing delaying circuit) for the AC-DC converter according to the invention. In the modification, the operation of the turn on timing delaying circuit 106 mentioned in the first embodiment, namely, the operation for making the ON time of the second switching element 302 narrower than that of the first switching element 301 with a given ratio, is realized in another way.

The ON time control circuit 500 comprises a current control circuit 501, a first comparator 502, a second comparator 503, an OR gate 504, a resistor 505, and a diode 506. The output PW1 of the PWM control circuit 105 is supplied to an input CLK of the current control circuit 501. The relation among terminals, ia, ib, 4ia and 4ib, of the current control circuit 501 is: 4×ia=4×ib=4ia =4ib. The terminals ia and 4ia are connected to the minus side of the first comparator 502 and the terminals ib and 4ib are to the minus side of the second comparator 503, respectively. The output of the comparators 502, 503 are supplied to the OR circuit 504 and the STP terminals STPa and STPb of the current control circuit 501, respectively.

Figure 7:
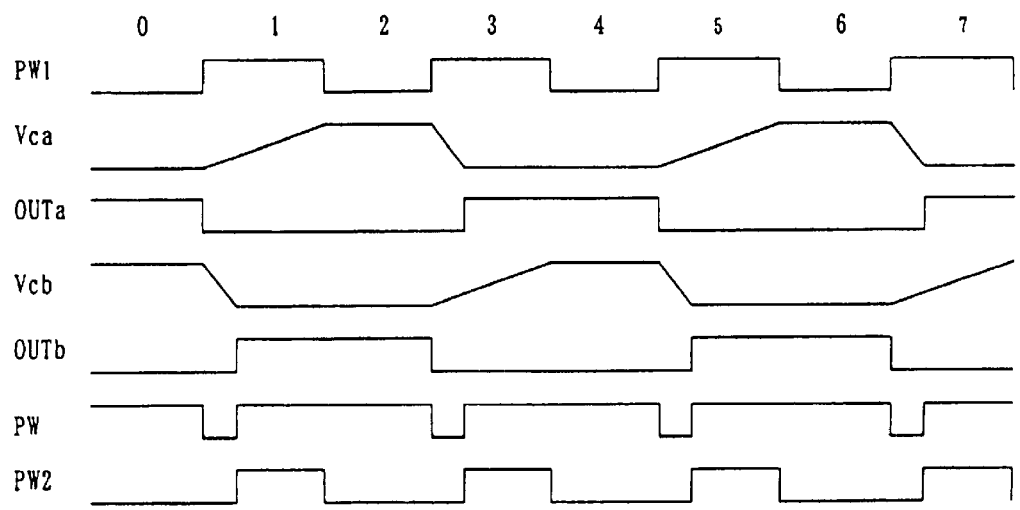
FIG. 7 is a timing chart representing an operation of the turn-on timing delaying circuit depicted in FIG. 6.

FIG. 7 is a timing chart of the operation in the ON time control circuit 500. During the term 0, no electric current flows at any of the terminals of the current control circuit 501. During the term 1, a current flows to an output terminal ia and the voltage Vca gradually increases; during the term 2, the current at the output terminal ia stops to flow, and the voltage Vca is held. Then, during the term 3, four times current of the current at the terminal ia flows to the terminal 4ia, so that the voltage at Vca goes down to 0V with a four times speed of that when the voltage Vca goes up during the term 1. When the voltage at Vca becomes 0V, the output of the first comparator 502 becomes high, so that a current stop signal is supplied to the current stop signal input terminal STPa to stop the current flow to the terminal 4ia. The high condition of the first comparator 502 is kept until the end of the term 4.

On the other hand, during the term 3, a current starts up to flow to an output terminal ib and the same operation mentioned above is carried out at the output terminal ib, the second comparator 503, the input terminal 4ib and the current stop signal input terminal STPb, but with a delay from the output signal PW1 of the PWM control circuit 105 by one cycle thereof. The voltage at Vcb varies in the same manner as the voltage at Vca.

As a result, the outputs OUTa and OUTb of the first and second comparators 502 and 502 are outputted alternatively as pulse signals having a delay with the rising time from that of PW1 by a given amount. These pulse signals are added at the OR circuit 504 to generate an output WS, which is supplied to the second switching element 302 via the resistor 505 and the diode 506. The output WS has the same frequency as that of the PW1 of the PWM control circuit 105, and a given LOW time corresponding to the LOW term of the output PW1 by the resistor 505 and the diode 506. The objected output PW2, where the ON time is narrower than that of the PW1 with a given ratio, is obtained in this manner.

It should be noted that according to the construction shown in FIG. 6, the objected pulse PW2 is generated being delayed by 1 or 2 pulses just after the control has been started up. However, the converter would have no problem by this delay at the beginning.

The same operation in the ON time control circuit 500 can also be obtained by providing counters instead of the comparators 502 and 503. That is to say, the current control circuit 501 is arranged such that clocks having a frequency sufficiently higher than that of the PW1 are generated; the output current at the terminal a is replaced to count-up pulses by the counter, and the current at the terminal 4*ia* is replaced to count-down pulses having a four times counting speed. The MSB outputs of the counters correspond to the outputs of the comparators 502, 503. In a case that binary counters are used, the counted-up pulse signals should be shifted by two bits and rounded off, and the count-down operation should be conducted with the same speed of the count up operation.

By repeating the above-mentioned operation, the ON time of the first switching element 301 becomes 1.33 times of that of the second switching element 302.

It is preferred to make difference in the turn-on timing and turn it OFF at the same timing, because an electric current can be detected easily, it is convenient for conducting a PWM control in an electric current mode or for conducting an over current protection pulse by pulse.

Furthermore, the pulse width changing circuit (ON time control circuit) mentioned in all of the above explained embodiments can also be realized by using a DSP (Digital Signal Processor) where the pulse widths of the two switching elements are preliminarily programmed.

Moreover, in the above-explained embodiments, a flyback converter is explained; however, the present invention can also be applied to forward type converters, half bridge type converters, and full bridge type converters, etc. Furthermore, there is no limitation in the switching element control system to be used in the converter according to the invention; that is to say, controlling systems other than a PWM system, i.e. PFM controlling system, a self-oscillating controlling system or a frequency controlling system, can be applied to the present invention.

Figure 8:
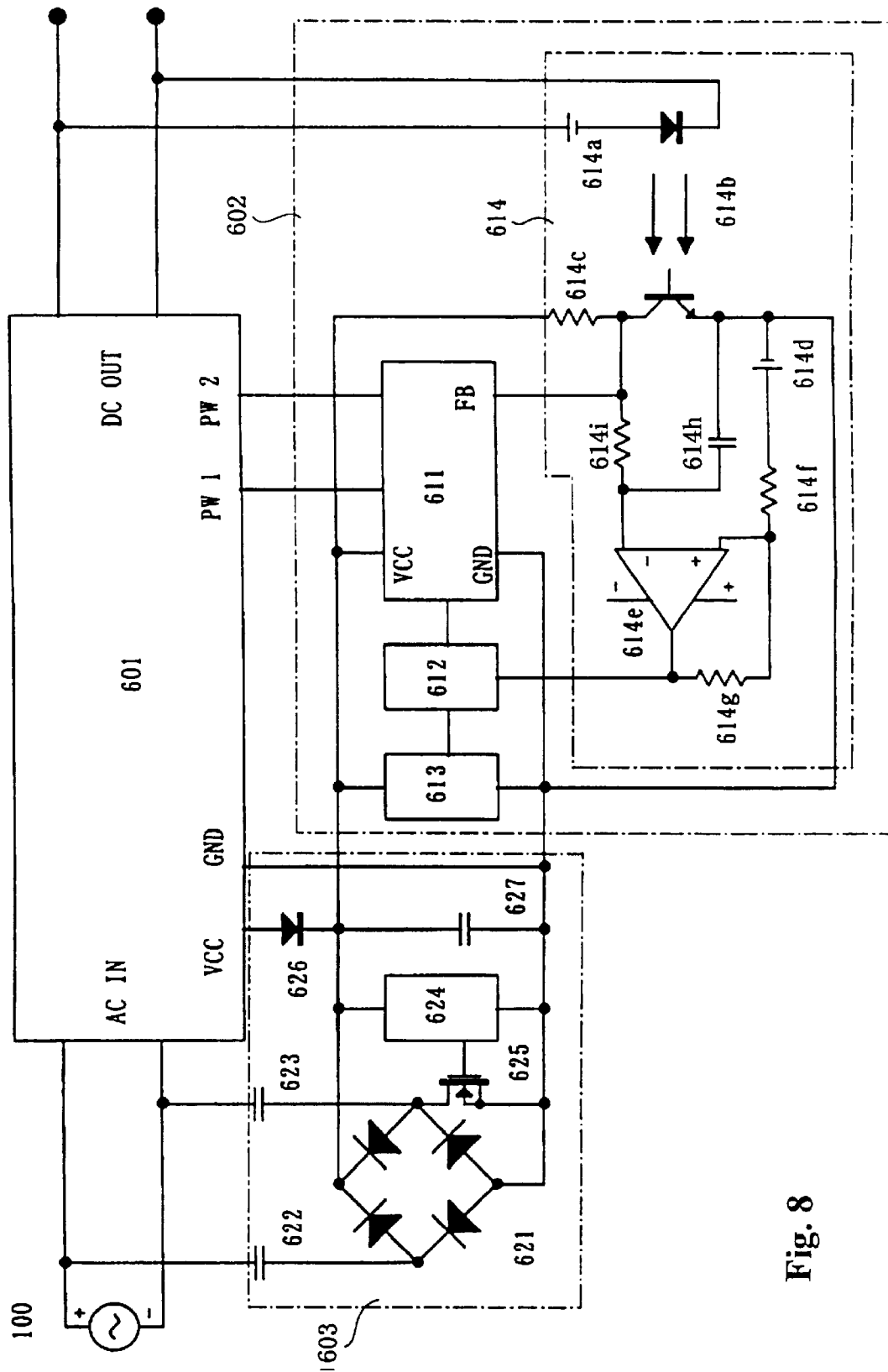
FIG. 8 is a circuit diagram illustrating a construction of the fifth embodiment according to the present invention.

FIG. 8 is a block diagram showing a construction of the fifth embodiment of the AC-DC converter according to the present invention. In FIG. 8, the numerical reference 601 refers a power supply section including the PFC power supply section 102 and the DC-DC power supply section 103, and the first and second switching elements 301 and 302, etc.; the numerical reference 602 represents a driving control section of the switching elements, and 603 represents a starting-up circuit for the driving control section 602.

The switching element driving control section 602 comprises a pulse width control circuit 611, a gate circuit 612, an oscillating circuit 613, and an intermittent oscillation control circuit 614 for controlling the operation of the pulse width control circuit 611.

Under the condition that a rated load is applied, the driving control section 602 operates as follows; an output of the oscillator 613 is supplied to the pulse width control circuit 611 via the gate circuit 612 to generate the pulse outputs PW1 and PW2, then the pulse outputs PW1 and PW2 are supplied to the switching elements 301 and 302 in the power supply section 601 to obtain a DC output. The DC output of the power supply section 601 is taken out and returned to the control circuit 611 side via a reference voltage 614*a* and a photo coupler 614*b*; then supplied to the FB input terminal of the control circuit 611.

When the load of the DC output of the power supply section 601 is light, the voltage at the FB terminal comes down, then when the voltage becomes lower than the voltage supply 614*d*, the output of the comparator 614*e* increases to stop the output of the gate circuit 612. Thereby, the output of the pulse width control circuit 611 stops to output, so that the pulse outputs PW1 and PW2 stops to be supplied. A positive feed back is applied to the comparator 614*e* by the resistors 614*f* and 614*g*, so that the comparator 614*e* has a hysteresis characteristic. Therefore, when the DC output of the power supply section 601 becomes lower than a predetermined voltage, the voltage at the FB terminal increases, and the gate circuit 612 opens again to re-start the switching operation. As a result, when the load of the power supply 601 is light, the switching elements 301 and 302 oscillate intermittently. The intermittent frequency becomes low by the hysteresis effect of the comparator 614*e*, so that the strange sounds is reduced to be generated. At the minus terminal of the comparator 614*e*, a time constant circuit constituted of a capacitor 614*h* and a resistor 614*i* is provided; thereby the intermittent frequency of the switching operation can be made lower.

In the embodiment shown in FIG. 8, the hysteresis effect is obtained by the positive feedback applied on the comparator 614*e*, however, it may be also obtained by a combination of two comparators and a latch circuit.

The starting-up circuit 603 comprises a bridge diode 621, starting-up capacitors 622 and 623, which work as a reactance dropper, being provided between the bridge diode 621 and AC inputs, a voltage detecting circuit 624 provided after the bridge diode 601, a switch element 625 provided between the voltage detecting circuit 624 and one of the starting-up capacitors 623, a diode 626 connected to a VCC terminal from a VCC coil (not shown) of the power supply section 601, and a smoothing capacitor 627. The electric current flowing through the starting-up capacitors 621 and 622 is rectified by the bridge diode 603, then smoothed by the smoothing capacitor 627 to start up the switching element driving section 602. A power consumption can be reduced by using the capacitors 621 and 622 in the starting-up circuit 603 instead of a starting-up resistor.

Under the condition that the smoothing capacitor 627 is so designed to suitably operate for accepting an input voltage 100V, when an input voltage 240V is applied, the voltage at the capacitor 627 becomes too high. In the present invention, the voltage detecting circuit 624 is provided in the present invention, so that when the input voltage becomes higher than a predetermined value, the switch element 625 is shortened. Thereby, when a high input voltage, for instance, 240V is applied, the current flowing the starting-up capacitor 623 becomes invalid so that the current is not stored at the smoothing capacitor 627. In this manner, the power loss, which is caused when the input voltage is high (240V) can be prevented by adding the voltage detecting circuit 624 and the switch 625. It may be possible to give a hysteresis characteristic to the voltage detecting circuit 625. Further, it may also be arranged such that the power necessary to drive the control circuit 611 is obtained from the VCC terminal of the power supply section 601 via the diode 627.

The scope of the present invention is not limited to the above explained embodiments and modifications, so that other modifications or variations can be applied. For instance, the π shaped filter 102*b* is provided after the bridge diode 102*a*, however, the capacitor constituted of the filter has a very small capacitor only in comparison to that of the smoothing capacitor 103*b* and has almost no smoothing function. Therefore, only one capacitor may be altered therefor or both the capacitors may be omitted.

Further, the starting-up circuit 603 and/or the switching element driving control circuit 602 can be applied to any embodiments shown in FIGS. 1 to 5.

As explained above, according to the present invention, it is arranged such that the duty ratio of the switching element of the PFC power supply section is higher than that of the switching element of the DC-DC power supply to make the inductance at the rectified current side power supply section high, so that the current waveform becomes a wide triangle shape or a trapesoidal shape. Therefore, the route-mean-square current is decreased and thus a high efficiency can be realized. Further, an AC-DC converter which satisfies the EEC standard 61000-3-2 Class D without respective to the height of the input voltage, can be provided. Furthermore, a two-stage type AC-DC converter, where power consumption during standby time can be reduced and the manufacturing cost thereof can also be reduced.

What is claimed is:

1. A single-phase AC-DC converter comprising: a PFC power supply section, where a rectified current obtained by rectifying an electric current from an AC supply is switched; a DC-DC power supply section, where a direct current obtained by rectifying and smoothing an electric current from an AC supply is switched; a first switching means for conducting a switching operation in said PFC power supply section; a second switching means for conducting a switching operation in said DC-DC power supply section; a drive pulse generating circuit for generating first drive pulses for driving said first switching means and second drive pulses for driving said second switching means; and a servo loop for controlling said drive pulse generating circuit; wherein said servo loop is constituted of only one serve loop; and wherein said converter comprises a duty ratio controlling means for making a duty ratio of said drive pulses for driving said first switching means and a duty ratio of said drive pulses for driving said second switching means different from each other in a linked manner.

2. An single phase AC-DC converter according to claim 1, wherein said PFC power supply section comprises an input for connection to a source of a single phase AC supply, a first rectifying circuit for rectifying an electric current supplied from said inputs, a first transformer where one end of the primary coil thereof is connected to an output of said rectifying circuit and other end of said primary coil is connected to said first switching means, and a first secondary side rectifying circuit for rectifying an output of the secondary side of said first transformer; wherein said DC-DC power supply section comprises an input for connection to a source of single phase AC supply, a second rectifying circuit for rectifying an electric current supplied from said inputs, a smoothing circuit for smoothing an output of said second rectifying circuit, a second transformer where one end of the primary coil thereof is connected to an output of said smoothing circuit and the other end of said primary coil is connected to said second switching means, and a second secondary side rectifying circuit for rectifying an output of the secondary side of said second transformer; and wherein said converter comprises an adding and smoothing circuit for adding an output of said PFC power supply section and an output of said DC-DC power supply section together and smoothing the added outputs.

3. An single phase AC-DC converter according to claim 1, wherein said PFC power supply section comprises an input for connection to a source of single phase AC supply, a first rectifying circuit for rectifying an electric current supplied from said inputs, a first transformer where one end of the primary coil thereof is connected to an output of said rectifying circuit and the other end of said primary coil is connected to said first switching means, and a first secondary side rectifying circuit for rectifying an output of the secondary side of said first transformer; wherein said DC-DC power supply section comprises an input for connection to a source of single phase AC supply, a smoothing circuit for smoothing an electric current supplied from said inputs, a second transformer where one end of the primary coil thereof is connected to an output of said smoothing circuit and the other end of said primary coil is connected to said second switching means, and a second secondary side rectifying circuit for rectifying an output of the secondary side of said second transformer; wherein said converter comprises an output adding and smoothing circuit for adding an output of said PFC power supply section and an output of said DC-DC power supply section together and smoothing the added outputs; and wherein an inductor and a diode are inserted between said second switching means and an output of said first rectifying circuit or between said second switching means and said AC inputs.

4. A single phase AC-DC converter according to claim 1, wherein said PFC power supply section comprises an input for connection to a source of a single phase AC supply, a first rectifying circuit for rectifying an electric current supplied from said inputs, a first transformer where one end of the primary coil thereof is connected to an output of said rectifying circuit and other end of said primary coil is connected to said first switching means, and a first secondary side rectifying circuit for rectifying an output of the secondary side of said first transformer; wherein said DC-DC power supply section comprises an input for connection to a source of single phase AC supply, a smoothing circuit for smoothing an electric current supplied from said inputs, a second transformer where one end of the primary coil thereof is connected to an output of said smoothing circuit and other end of said primary coil is connected to said second switching means, and a second secondary side rectifying circuit for rectifying an output of the secondary side of said second transformer; wherein said converter comprises an output adding and smoothing circuit for adding an output of said PFC power supply section and an output of said DC-DC power supply section together and smoothing the added outputs; and wherein either one of said first transformer or said second transformer comprises a tertiary coil, and one end of the tertiary coil is connected to an output of said smoothing circuit and other end thereof is connected to an output of said first rectifying circuit via a diode or to said AC inputs via a diode.

5. A single phase AC-DC converter according to claim 1, wherein the PFC power supply section comprises an input for connection to a source of a single phase AC supply, a first rectifying circuit for rectifying an electric current supplied from said inputs, a choke coil where one end of the coil thereof is connected to an output of said rectifying circuit and other end of the coil is connected to said first switching means; wherein said DC-DC power supply comprises a second rectifying circuit for rectifying an output of said choke coil, a first smoothing circuit for smoothing an output of said second rectifying circuit, a transformer where one end of the primary coil thereof is connected to an output of said smoothing circuit and the other end of the primary coil is connected to said second switching means, a secondary side rectifying circuit for rectifying an output at the secondary side of said transformer, and a second smoothing circuit for smoothing an output of said secondary side rectifying circuit.

6. A single phase AC-DC converter according to claim 1, wherein the PFC power supply section comprises an input for connection to a source of a single phase AC supply, a first rectifying circuit for rectifying an electric current supplied from said inputs, a first transformer where one end of the primary coil thereof is connected to an output of said rectifying circuit and other end of the primary coil is connected to said first switching means, and a first secondary side rectifying circuit for rectifying an output at the secondary side of said first transformer; wherein said DC-DC power supply comprises a second rectifying circuit for rectifying an output at the primary side of said first transformer, a first smoothing circuit for smoothing an output of said second rectifying circuit, a second transformer where one end of the primary coil thereof is connected to an output of said first smoothing circuit and other end of the primary coil is connected to said second switching means, a second secondary side rectifying circuit for rectifying an output at the secondary side of said second transformer, a second smoothing circuit for smoothing an output of said second secondary side rectifying circuit; and wherein said converter comprises an adding and smoothing means for adding an output of said PFC power supply section and an output of said DC-DC power supply section together and smoothing the added output.

7. A single phase AC-DC converter according to claim 1, wherein the drive pulses for driving the first switching means and the drive pulses for driving the second switching means turn on at a different timing from each other but turn off at the same timing.

8. A single phase AC-DC converter according to claim 1, wherein the ON time of the drive pulses for driving the first switching means and the ON time of the drive pulses for driving the second switching means are different from each other keeping a given relation therebetween, whereby the ratio between the duty ratio of the first switching means and the duty ratio of the second switching means becomes constant.

9. A single phase AC-DC converter according to claim 1 further comprising a drive pulses intermittent oscillation control means by which the drive pulse generating means generate the drive pulses intermittently.

10. A single phase AC-DC converter according to claim 9, wherein said drive pulses intermittent oscillation control means comprises a comparator having a hysteresis characteristic and/or a time constant so that the drive pulse output of the drive pulse generating means is controlled in accordance with the output of said comparator.

11. A single phase AC-DC converter according to claim 1 further comprising a starting-up circuit for starting the drive pulse generating circuit up; wherein said starting-up circuit comprises an input for connection to a source of single phase AC supply, a rectifying circuit for rectifying an electric current supplied from said inputs, a smoothing circuit for smoothing an output of said rectifying circuit, and starting-up capacitors being provided between said AC inputs and said rectifying circuits.

12. A single phase AC-DC converter according to claim 11, wherein said rectifying circuit is constituted of a bridge rectifying circuit; and wherein said starting-up circuit further comprises a voltage detecting circuit after said rectifying circuit, and a switch element, which is driven by the output of the voltage detecting circuit, being provided at an output side either one of the starting-up capacitors.

* * * * *